Figure 1:
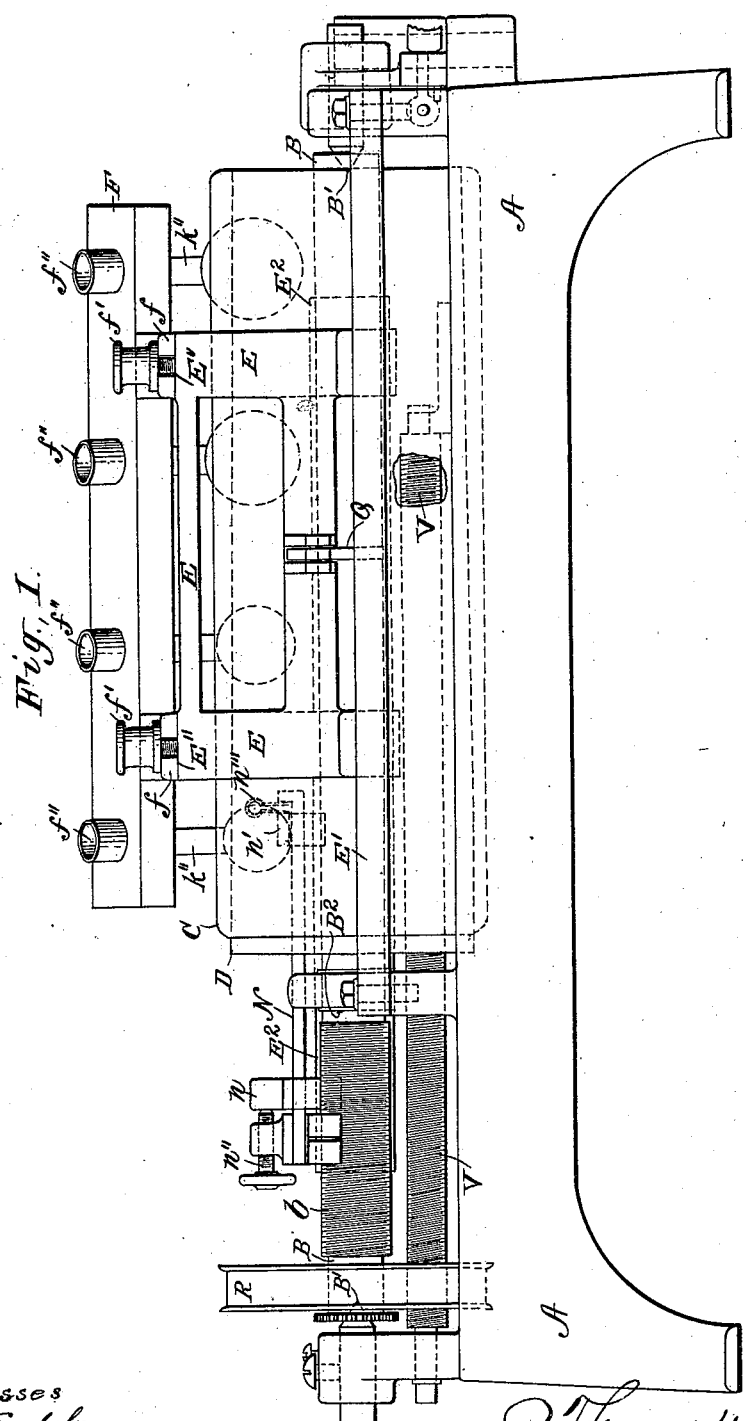

No. 711,706. Patented Oct. 21, 1902.
T. H. MACDONALD.
MULTIPLE GRAPHOPHONE.
(Application filed June 11, 1898.)

(No Model.) 3 Sheets—Sheet 1.

Witnesses
Inventor
Thomas H. Macdonald
by his attorneys.

No. 711,706. Patented Oct. 21, 1902.
T. H. MACDONALD.
MULTIPLE GRAPHOPHONE.
(Application filed June 11, 1898.)
(No Model.) 3 Sheets—Sheet 2.
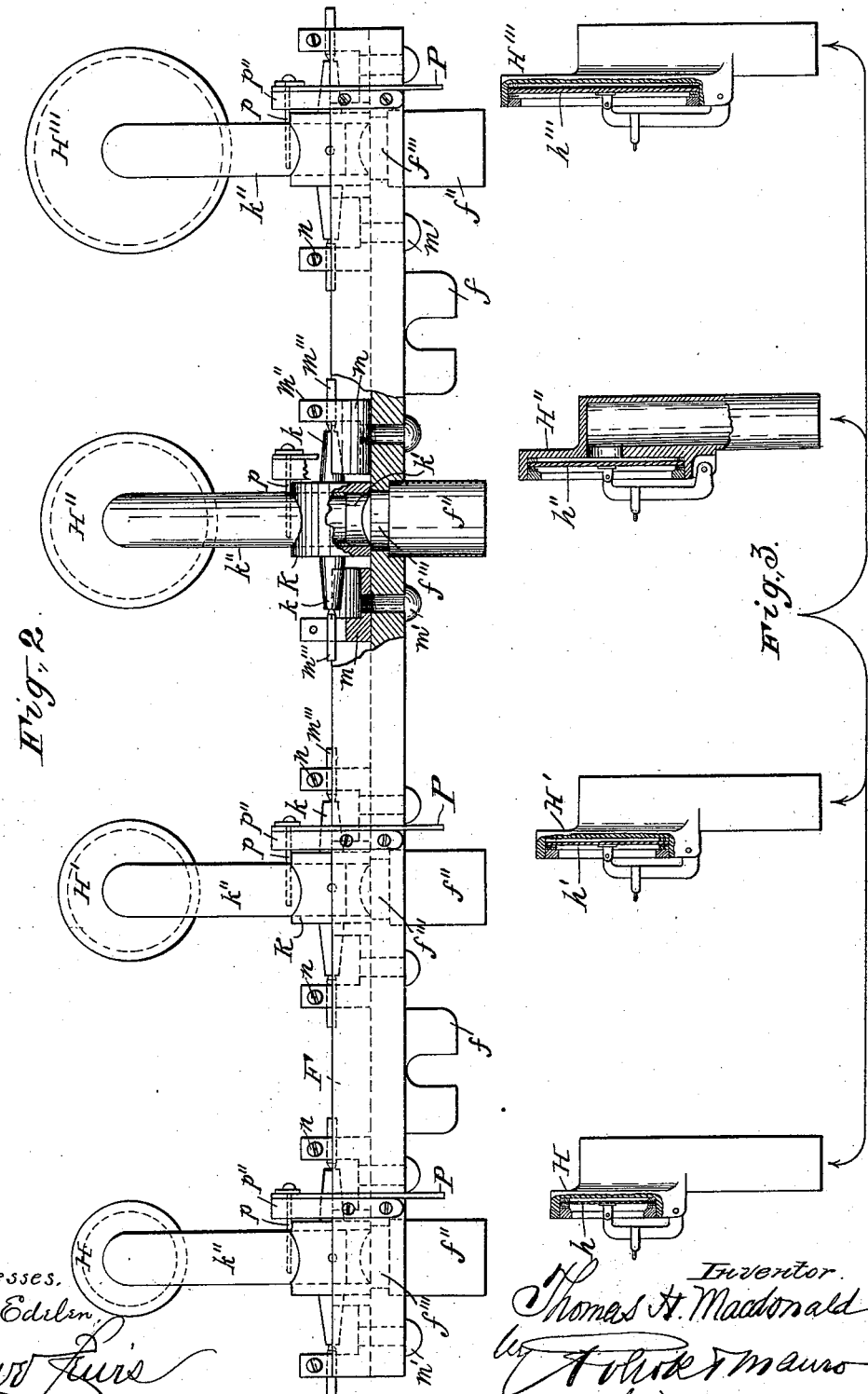

No. 711,706. Patented Oct. 21, 1902.
T. H. MACDONALD.
MULTIPLE GRAPHOPHONE.
(Application filed June 11, 1898.)
(No Model.) 3 Sheets—Sheet 3.
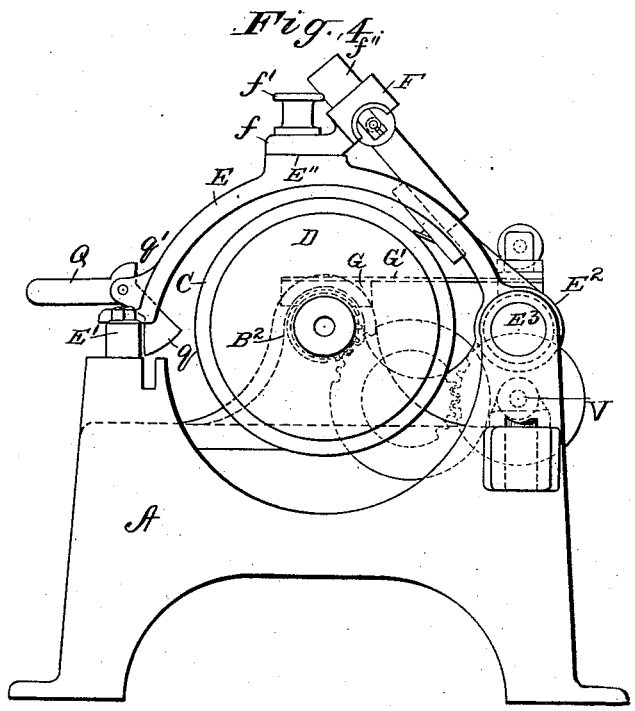
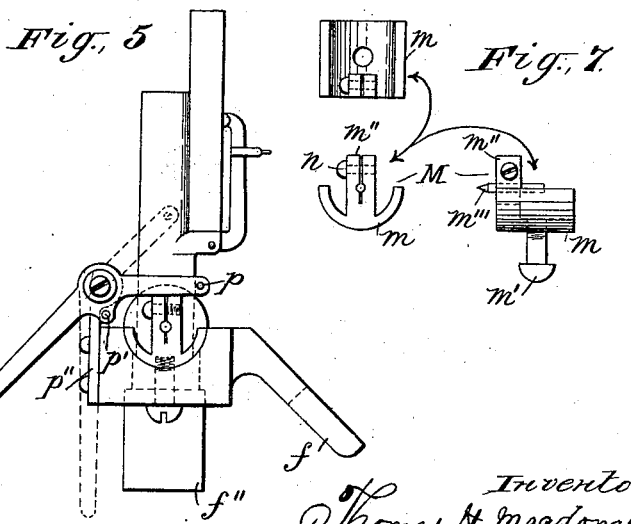
Witnesses.
Inventor
Thomas H. Macdonald

UNITED STATES PATENT OFFICE.

THOMAS H. MACDONALD, OF BRIDGEPORT, CONNECTICUT, ASSIGNOR TO THE AMERICAN GRAPHOPHONE COMPANY, OF WASHINGTON, DISTRICT OF COLUMBIA, A CORPORATION OF WEST VIRGINIA.

MULTIPLE GRAPHOPHONE.

SPECIFICATION forming part of Letters Patent No. 711,706, dated October 21, 1902.

Application filed June 11, 1898. Serial No. 683,230. (No model.)

*To all whom it may concern:*

Be it known that I, THOMAS H. MACDONALD, of Bridgeport, Connecticut, have invented a new and useful Improvement in Multiple Graphophones, which improvement is fully set forth in the following specification.

It has been proposed heretofore to actuate a plurality of recording-points by the diaphragm of a sound-recorder, so as to make several records simultaneously, either on the same recording-tablet or on separate tablets. It has also been proposed to arrange a number of recorders (each having a single stylus) to act simultaneously upon a recording-surface, each to make a record for a single voice or instrument. The object of the plan first mentioned has been either to multiply the production of sound-records or to obtain in reproducing louder effects. The object of the second plan has been to reproduce the different records simultaneously, thus obtaining the effects of concerted music. This latter plan (which more nearly than the first resembles my present invention) has never been realized in practice, mainly because no effective means have been known whereby a number of reproducing instruments could be made to work in absolute unison from a multiple record, but partly also because good practical records of a number of voices or instruments are obtained with a single diaphragm and recording-stylus.

The object of the present invention is primarily to obtain superior acoustical results in recording and reproducing concerted music, either vocal or instrumental.

I have found that recording and reproducing instrumentalities which give the best results for sounds of a particular character are not the most suitable for sounds of a different character. This applies particularly to the diaphragm. For sounds of high pitch a diaphragm of smaller diameter and less thickness should be used to produce the best results, whereas for sounds of lower pitch a diaphragm of greater diameter and thickness is more effective. This applies as well to the diaphragm of the reproducer as to that of the recorder. Consequently when a single recorder or reproducer is used the best that can be done is to proportion the diaphragm to sounds of intermediate pitch. It is also found that the diaphragm of a graphophone can respond effectively to but a limited number of instruments. It will record effectively an orchestra of, say, eight or ten instruments, but doubling the number of instruments would not increase the fullness of tone in anything like the same proportion. The resultant sound-wave becomes too complex for the diaphragm to follow. By using, in the manner hereinafter described, a number (two or more) of recorders and a corresponding number of reproducers I am able to obtain acoustical effects superior in quality and superior also in fullness as distinguished from mere loudness. To this end the multiple graphophone is provided with any desired number—say four—of recorders, each having a diaphragm differing in diameter and thickness from the others. In making records with this instrument the performers will be so grouped and the sound-conveying tubes so arranged that the great volume of the sound of high pitch will converge upon the most sensitive diaphragm, those of a lower pitch upon a less sensitive diaphragm, and so on.

The invention also embraces improvements in mechanical construction, and particularly in the means for securing requisite harmonious operation of the several recording and reproducing devices, as will be hereinafter more fully described.

One embodiment of my invention is illustrated in the accompanying drawings, in which—

Figure 1 is a front elevation of the multiple graphophone. Fig. 2 is an enlarged side elevation, with parts broken away, of the carrier-bar and the recorders or reproducers supported thereby. Fig. 3 is a view illustrating the proportionate thickness of the several diaphragms, said thickness in each case being somewhat exaggerated for the sake of clearness. Fig. 4 is an end view of Fig. 1, showing a recorder in operative position. Fig. 5 is an end view of Fig. 2, showing the manner of mounting the recorders and reproducers on the carrier-bar and the means for individually raising the recorder or reproducers from the record. Fig. 6 shows an edge view of the lifting-lever; Fig. 7, a plan, end, and side elevations of the bearings for the recorders and reproducers.

A is the frame of the machine, and B is a shaft mounted to turn on bearings B' at each end of the frame and bearing B² in a bar extending across the frame between the bearings B' B'. The surface of this shaft, near one end thereof, is screw-threaded, as shown at b, between one of the end bearings B' and the bearing B², and for the remainder of its length it supports the mandrel D, over which the cylindrical tablet C may be slipped, the length of the screw-threaded portion b being only a fraction of the length of the mandrel D.

The carriage for the recorder or reproducer bar F consists of two cross-arms E, spanning the machine from side to side, suitably spaced by bars e e' and having their front ends bearing upon the guide-rest E', while their rear ends are connected to the sleeve E², traveling on the guide or way E³, Fig. 4.

G is a half-nut resting normally upon the screw b and having an arm G' connecting it to the bar N, sliding longitudinally of the sleeve E² in bearings n n', rigidly secured to said sleeve. One end of the bar N has a screw-nut secured thereto, through which a screw n" is passed, with its end abutting the bearing n of the sleeve E², and a spring n''' (see Fig. 1) is interposed between the bearing n' and an upturned lug on the sleeve E², said spring acting in opposition to the screw n", whereby the bar N may be adjusted in either direction along the sleeve E² by operating the screw n". The cross-arms E have each a level smoothly-planed surface e", upon which surfaces the recorder or reproducer bar F is supported. This bar F has slotted lugs f, whose under sides are planed, so as to bear smoothly and evenly upon the surfaces e", the screws f' serving to firmly hold the bar in position and the slots in the lugs f permitting the ready removal and replacement of the bar by simply loosening the screws. The bar F has projecting from its face a number of tubes f", there being one of such tubes for each recorder or reproducer to be used. On the under side, or the side opposite the projecting tubes f", the bar has formed therein a longitudinal concave groove or channel, preferably semicylindrical in cross-section, said channel being connected with the tubes f" by holes f''', as shown in Fig. 2.

H H' H" H''' are the recorders or reproducers, here shown as four in number, though any desired number may be employed, and h h' h" h''' are the diaphragms thereof. Of these diaphragms h has the least diameter and is the thinnest, it being designed to record or reproduce sounds of a high pitch, while diaphragm h' is of a slightly-larger diameter and is a little thicker than diaphragm h and is intended to record or reproduce sounds of a mediumly-high pitch, but lower than those sounds in connection with which diaphragm h operates. In a like manner diaphragm h" is of greater diameter and thicker than h', and h''' is of greater diameter and thicker than h", each being designed to record and reproduce sounds of a pitch lower than the one preceding it in the series. In the drawings diaphragms h, h', h", and h''' are respectively three-fourths of an inch, one inch, one and one-quarter inches, and one and one half inches in diameter, and I have found that with these diameters a very satisfactory thickness for the diaphragms to be h—.004 inch, h'—.0055 inch, h" .007 inch, and h''' .0085 inch. The diaphragms of Fig. 3 have the thickness considerably exaggerated, owing to the difficulty of properly representing a diaphragm of .004 of an inch thick; but it will be understood that the exact proportions of the diaphragms as shown in the drawings or as given herein are not essential, so long as several diaphragms differing in diameter and thickness are employed. It will be also understood that while I have for purposes of illustration shown in Fig. 3 diaphragms of reproducers the same principle of varying the diameter and thickness of the diaphragm to suit the character of the sounds applies with equal force whether it be in connection with the diaphragm of a recorder or a reproducer.

For the purpose of mounting the recorders or reproducers on the bar F a cylindrical trunnion-block K, provided with trunnions k, has a hole k' bored transversely through it, and the stem k" of the recorder or reproducer is inserted therein. Seated in the groove of the bar F and on opposite sides of each of the holes f'''' formed in the bar are bearing-blocks M, Figs. 2 and 7, the base m of the block being curved to fit the groove in the bar, in which it is secured by screws m' or other suitable means. The uprights m" of the bearing-block M are split to form clamps, in which are held the bearing-points m''', a screw or other device n being used to tighten the clamps, so as to securely hold the bearing-points m''' in any adjusted position. The trunnion-blocks K when mounted to turn on the bearing-points m''' fit the groove in the bar F neatly, only sufficient clearance being allowed to admit of free motion. Provision is made whereby each one of the recorders or reproducers may be separately raised from the record-tablet. For this purpose a lever P, Figs. 2, 5, and 6, is fulcrumed on a bracket p", attached to the side of the bar F, said lever having a pin p extending under the stem k" of the recorder or reproducer, as clearly shown in Figs. 2 and 5. A second pin p' projects from the side of the lever P in a position to be just free from contact with the bracket p" when the style of the recorder or reproducer is resting on the face of the tablet C, so that said pin in no way interferes with the movements of the recorder or reproducer in relation to the tablet. If it is found desirable to throw any one of the recorders or reproducers out of action, it is only necessary to turn the lever P from the full-line to the dotted-line position of Fig. 5, when the pin $p$ acts to lift the recorder or reproducer from off the tablet. A suitable restraining device may, if desired, be employed to engage and hold the lever P in the dotted-line position. Pivoted to the cross-bar $e'$ of the carriage is a lever G, having a face $q$ formed on its inner end and a face $q'$ on a lug projecting from the lever near its pivoted point. When it is desired to raise the carriage, so as to throw all the recorders or reproducers out of operative relation to the record-tablet C, the handle end of the lever is seized and the entire carriage lifted. As soon as the face $q$ is raised above the top surface of the guide-rest E' the lever Q turns on its pivot until the face $q'$ abuts the spacing-bar $e'$, at which time the face $q$ will be immediately over the guide-rest E', and if allowed to bear upon said guide-rest will support the carriage in its elevated position. When the carriage is thus raised, each recorder or reproducer is prevented by the engagement of the pin $p'$ with the bracket $p''$ from turning on its trunnions under the action of gravity, and hence the recorders and reproducers are raised with the bar F and the carriage.

R is a suitable driving-pulley on the shaft B. The bearing B' at the end of said shaft opposite the screw-threads $b$ is mounted in an end gate, which is swung to one side when the tablet C is to be placed upon or removed from the mandrel D, but which is normally closed, so as to hold the bearing B' in operative relation with the shaft B, as is shown in Fig. 1.

In practice it is found more convenient to employ two bars F, one to carry a set of recorders and one a set of reproducers, the latter being spaced on the bar F so as to exactly correspond with the spacing of the recorders. In order to accomplish this, the recorders are mounted on the bar F and are arranged so as to be as nearly equidistant from each other as possible. The bar carrying the reproducers is next assembled, the bearing-blocks M being placed as nearly as possible to correspond with the ones on the recorder-bar. The reproducers are then swung between the bearing-points $m'''$, and one pair of these bearing-points—as, for example, the one at the left in Fig. 2—securely clamped. The other reproducers are then carefully spaced and set with reference to the fixed one and with reference to the corresponding recorder on the recorder-bar. For this purpose a suitable jig may be used, if desired, and the several reproducers having been adjusted so as to exactly correspond to the spacing of the recorders the bearing-points $m'''$ are securely clamped. By this means it is rendered certain that the several reproducer-styles will always occupy the same relative positions on the record-tablet that were occupied by the corresponding recorder-styles, and hence all sounds which are simultaneously recorded by the recorders will be simultaneously reproduced by the reproducers.

It will be apparent that the method of swinging the recorders and reproducers on trunnions having a considerable distance between the bearing-points and arranging these on a rigid bar gives the firm and accurate construction which is so highly essential in the production of even clear records. Considerable advantage is also gained by having a straight sound-tube of even diameter and a very close joint between the trunnion-blocks and the bar F.

Primarily the machine is intended for use as a multiple graphophone in which a plurality of recorders or reproducers shall operate at the same time, but obviously all of the recorders or reproducers except one may be thrown out of operation, when the machine will operate as an ordinary graphophone, using but a single diaphragm; but inasmuch as the carriage has a travel of but a fraction of the length of the record-cylinder, which, as shown in the present instance would be but one-fourth of such length, it would be impossible to utilize the entire surface of the record tablet or cylinder. For the purpose of using a single recorder or reproducer on the present machine in connection with the entire surface of the record-cylinder, as well as for the purpose of operating a shaver throughout the full length of the cylinder, I have provided a second screw-shaft V, journaled parallel with the shaft B in the frame A and screw-threaded throughout its entire length, the length of the shaft V being somewhat greater than that of the mandrel D. This screw-shaft V is connected by suitable gearing, as clearly shown in Fig. 4, with the shaft B. By removing the multiple carriage shown in the drawings and substituting a single carriage, with its nut in connection with the screw V, a recorder, reproducer, or shaver, as desired, may be caused to operate throughout the full length of the cylinder C.

It will be understood that while the machine herein described is a convenient and effective embodiment of my invention the invention itself is not limited to the construction described, but is broad enough to include any means whereby a plurality of diaphragms, each of which is especially adapted to sounds differing in character from sounds to which the others are adapted, are employed in the recording and reproduction of sounds.

Having thus described my invention, what I claim as new, and desire to secure by Letters Patent, is—

1. In a graphophone, the combination with a record-tablet, of a plurality of diaphragms having recording or reproducing points simultaneously contacting with said tablet different diaphragms being adapted to sounds differing in character from sounds to which other diaphragms are adapted.

2. In a graphophone, the combination with a record-tablet, of a plurality of diaphragms having recording or reproducing points simultaneously contacting with said tablet different diaphragms being adapted to sounds differing in pitch from sounds to which other diaphragms are adapted.

3. In a multiple graphophone, a plurality of simultaneously-operable recorders or reproducers having diaphragms of different thickness, substantially as described.

4. In a multiple graphophone, a plurality of simultaneously-operable recorders or reproducers having diaphragms of different diameters and thicknesses, substantially as described.

5. In a multiple graphophone, a plurality of recorders or reproducers having diaphragms of different diameters, the diaphragm having the greatest diameter being the thickest, and each of the other diaphragms being thinner than any diaphragm having a greater diameter, substantially as described.

6. In a multiple graphophone, a plurality of recorders or reproducers and means for independently throwing any one of the recorders or reproducers into or out of operative relation with the record-tablet, substantially as described.

7. In a graphophone the combination of a series of recorders or reproducers mounted on a suitable support, with means for independently adjusting said recorders or reproducers longitudinally of the series, substantially as described.

8. In a graphophone the combination of a recorder or reproducer, a transversely-bored trunnion-block having the stem of the recorder or reproducer inserted therein, with bearing-points supporting the trunnions of said block, clamps engaging said bearing-points, and means for supporting said clamps, substantially as described.

9. In a graphophone, the combination of a transversely-bored body having a semicylindrical longitudinal channel therein, a pair of clamps secured in said channel on opposite sides of the bore and supporting longitudinally-adjustable bearing-points, with a transversely-bored trunnion-block having the stem of a recorder or reproducer inserted therein, the trunnions of said block being supported by said bearing-points, substantially as described.

10. In a graphophone, a shaft supporting the record-mandrel and having a screw-threaded portion equal to but a fraction of the length of the mandrel, a second shaft having a screw-threaded portion as great as the length of the mandrel, and a carriage movable on a suitable way and having a nut engaging the screw-threads on one of said shafts, substantially as described.

11. In a graphophone, a carriage moving on a suitable way, a screw-threaded shaft, a nut engaging the screw-threads thereon, a connection between the nut and the carriage and means for longitudinally adjusting the nut on the carriage, substantially as described.

12. In a graphophone, a carriage moving on a suitable way, an adjustable slide on said carriage, a screw-threaded shaft, a nut engaging the screw-threads thereon, a suitable connection between said nut and slide and means for longitudinally adjusting said slide on the carriage, substantially as described.

13. An improved phonograph having a record-cylinder and a plurality of simultaneously-operative diaphragms or plates, each of said diaphragms or plates, by its construction, material or proportions, being adapted to respond to sounds of a given pitch or quality different from the others, with means for tracing records upon said cylinder.

14. An improved phonograph having a record-cylinder and a plurality of diaphragms or plates, each, by its construction, material or proportions, adapted to respond to sounds of a given pitch or quality different from the others, an individual stylus for each plate adapted to act simultaneously with the others on the cylinder and following an independent path on said cylinder.

In testimony whereof I have signed this specification in the presence of two subscribing witnesses.

THOMAS H. MACDONALD.

Witnesses:
C. A. L. MASSIE,
ELISHA K. CAMP.